US012764669B2

(12) United States Patent
Xiong et al.

(10) Patent No.: US 12,764,669 B2
(45) Date of Patent: Oct. 13, 2026

(54) TRANSMIT POWER CONTROL FOR DMRS BUNDLING FOR COVERAGE ENHANCEMENT

(71) Applicant: Intel Products IP LLC, Santa Barbara, CA (US)

(72) Inventors: Gang Xiong, Beaverton, OR (US); Gregory Ermolaev, Nizhny Novgorod (RU); Dong Han, Sunnyvale, CA (US); Bishwarup Mondal, San Ramon, CA (US); Sergey Sosnin, Zavolzhie (RU)

(73) Assignee: Intel Products IP LLC, Santa Clara, CA (US)

( * ) Notice: Subject to any disclaimer, the term of this patent is extended or adjusted under 35 U.S.C. 154(b) by 178 days.

(21) Appl. No.: 18/723,066

(22) PCT Filed: Feb. 7, 2023

(86) PCT No.: PCT/US2023/012508

§ 371 (c)(1),
(2) Date: Jun. 21, 2024

(87) PCT Pub. No.: WO2023/154275

PCT Pub. Date: Aug. 17, 2023

(65) Prior Publication Data

US 2025/0048272 A1 Feb. 6, 2025

Related U.S. Application Data

(60) Provisional application No. 63/320,853, filed on Mar. 17, 2022, provisional application No. 63/309,266, (Continued)

(51) Int. Cl.
*H04W 52/14* (2009.01)
*H04L 5/16* (2006.01)
(Continued)

(52) U.S. Cl.
CPC ............. *H04W 52/146* (2013.01); *H04L 5/16* (2013.01); *H04W 52/322* (2013.01); *H04W 52/58* (2013.01)

(58) Field of Classification Search
CPC . H04W 52/146; H04W 52/322; H04W 52/58; H04W 52/325; H04W 52/42; H04L 5/16; H04L 5/0051; H04L 1/08
(Continued)

(56) References Cited

U.S. PATENT DOCUMENTS 11,877,288 B2 * 1/2024 Marcone ............... H04L 1/1671
12,155,491 B2 * 11/2024 Yi ......................... H04L 1/1887
(Continued)

FOREIGN PATENT DOCUMENTS

CN 115915431 A * 4/2023 ............. H04L 25/02
WO WO-2015184949 A1 * 12/2015 ............ H04W 72/21
(Continued)

OTHER PUBLICATIONS

"Email discussion summary for [101-bis-e][130] NR_cov_enh", R4-2202330, (Jan. 26, 2022).
(Continued)

*Primary Examiner* — Mahendra R Patel
(74) *Attorney, Agent, or Firm* — Schwegman Lundberg & Woessner, P.A.

(57) ABSTRACT

A user equipment (UE) may determine one or more nominal time-domain windows (TDWs) for demodulation reference signals (DMRS) bundling for physical uplink control channel (PUCCH) transmissions of a PUCCH repetition. A start of a new actual TDW for the DMRS bunding is determined in response to an event which causes power consistency and phase continuity not to be maintained across the PUCCH transmissions of the PUCCH repetition. The UE may maintain power consistency and phase continuity within the new
(Continued)

actual TDW across two PUCCH transmissions of the PUCCH repetition. The event may comprise a use of different power control parameters for the two of the PUCCH transmissions of the PUCCH repetition within one of the nominal TDWs.

15 Claims, 7 Drawing Sheets

Related U.S. Application Data filed on Feb. 11, 2022, provisional application No. 63/308,867, filed on Feb. 10, 2022.

(51) Int. Cl.
*H04W 52/32* (2009.01)
*H04W 52/58* (2009.01)

(58) Field of Classification Search
USPC .......................................................... 370/281
See application file for complete search history.

(56) References Cited

U.S. PATENT DOCUMENTS

| | | | | |
|---|---|---|---|---|
| 2017/0026798 | A1* | 1/2017 | Prevatt | H04W 4/023 |
| 2017/0230219 | A1* | 8/2017 | Qin | H04L 25/022 |
| 2017/0331670 | A1* | 11/2017 | Parkvall | H04L 41/0233 |
| 2018/0317207 | A1* | 11/2018 | Liao | H04W 72/0446 |
| 2019/0342709 | A1* | 11/2019 | Markhovsky | G01S 13/767 |
| 2021/0067308 | A1* | 3/2021 | Ly et al. | H04L 5/16 |
| 2022/0321389 | A1* | 10/2022 | Taherzadeh Boroujeni | H04L 25/0224 |
| 2022/0407669 | A1* | 12/2022 | Zhang | H04W 72/23 |
| 2023/0024493 | A1* | 1/2023 | Sridharan et al. | H04L 1/1887 |
| 2023/0086126 | A1* | 3/2023 | Nam | H04W 72/20 370/329 |
| 2024/0244668 | A1* | 7/2024 | Islam | H04B 7/06964 |

FOREIGN PATENT DOCUMENTS

| | | | | |
|---|---|---|---|---|
| WO | WO-2018203653 A1 * | 11/2018 | | H04W 72/21 |
| WO | WO-2020167100 A1 * | 8/2020 | | H04W 52/48 |
| WO | WO-2022031919 A1 * | 2/2022 | | H04W 52/365 |
| WO | WO-2022031962 A1 * | 2/2022 | | H04L 1/1887 |
| WO | WO-2022169732 A1 * | 8/2022 | | H04W 74/08 |
| WO | WO-2023154275 A1 | 8/2023 | | |

OTHER PUBLICATIONS

"Final FL summary of PUCCH coverage enhancement", Moderator R1-2200806, (Feb. 9, 2022), 30 pgs.
"FL Summary#2 of joint channel estimation for PUSCH", Moderator R1-2200735, (Jan. 22, 2022).
"International Application Serial No. PCT/US2023/012508, Article 19 Amendment filed Jul. 21, 2023", 6 pages.
"International Application Serial No. PCT/US2023/012508, International Search Report mailed May 26, 2023", 4 pgs.
"International Application Serial No. PCT/US2023/012508, Written Opinion mailed May 26, 2023", 5 pgs.
"Remaining issues on joint channel estimation", China Telecom R1-2200486, (Jan. 11, 2022).
"International Application Serial No. PCT/US2023/012508, International Preliminary Report on Patentability mailed Aug. 22, 2024", 7 pgs.
"3GPP; TSG RAN; NR; Physical layer procedures for control (Release 17)", 3GPP TS 38.213 V17.0.0, (Jan. 5, 2022), 225 pgs.
"3GPP TS 38.214 V17.0.0", 3rd Generation Partnership Project; Technical Specification Group Radio Access Network;NR;Physical layer procedures for data(Release 17), (Dec. 2012), 211 pgs.

* cited by examiner

TRANSMIT POWER CONTROL FOR DMRS BUNDLING FOR COVERAGE ENHANCEMENT

PRIORITY CLAIM

This application is a U.S. National Stage Filing under 35 U.S.C. 371 from International Application No. PCT/US2023/012508, filed Feb. 7, 2023 and published in English as WO 2023/154275 on Aug. 17, 2023, which claims the benefit of priority to U.S. Provisional Patent Application Ser. No. 63/308,867, filed Feb. 10, 2022 [reference number AE1864-Z], U.S. Provisional Patent Application Ser. No. 63/309,266, filed Feb. 11, 2022 [reference number AE1888-Z], and U.S. Provisional Patent Application Ser. No. 63/320,853, filed Mar. 17, 2022 [reference number AE2510-Z], which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments, relate to transmit power control (TPC) and demodulation reference signals (DMRS) bundling.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

For a cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

One issue for 5G NR networks is transmit power control for DMRS bundling for coverage enhancement, and particularly, an event which causes power consistency and phase continuity not to be maintained across the PUCCH transmissions of the PUCCH repetition.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operation in a fifth-generation (5G) new radio (NR) network. In these embodiments, the UE may determine one or more nominal time-domain windows (TDWs) for demodulation reference signals (DMRS) bundling for physical uplink control channel (PUCCH) transmissions of a PUCCH repetition. The UE may also determine a start of a new actual TDW for the DMRS bunding in response to an event which causes power consistency and phase continuity not to be maintained across the PUCCH transmissions of the PUCCH repetition. The new actual TDW may start after the event. In these embodiments, the UE may be configured to maintain power consistency and phase continuity within the new actual TDW across two PUCCH transmissions of the PUCCH repetition. In some of these embodiments, the event may comprise a use of different power control parameters for the two of the PUCCH transmissions of the PUCCH repetition within one of the nominal TDWs. These embodiments, as well as others, are described in more detail below.

Figure 1A:
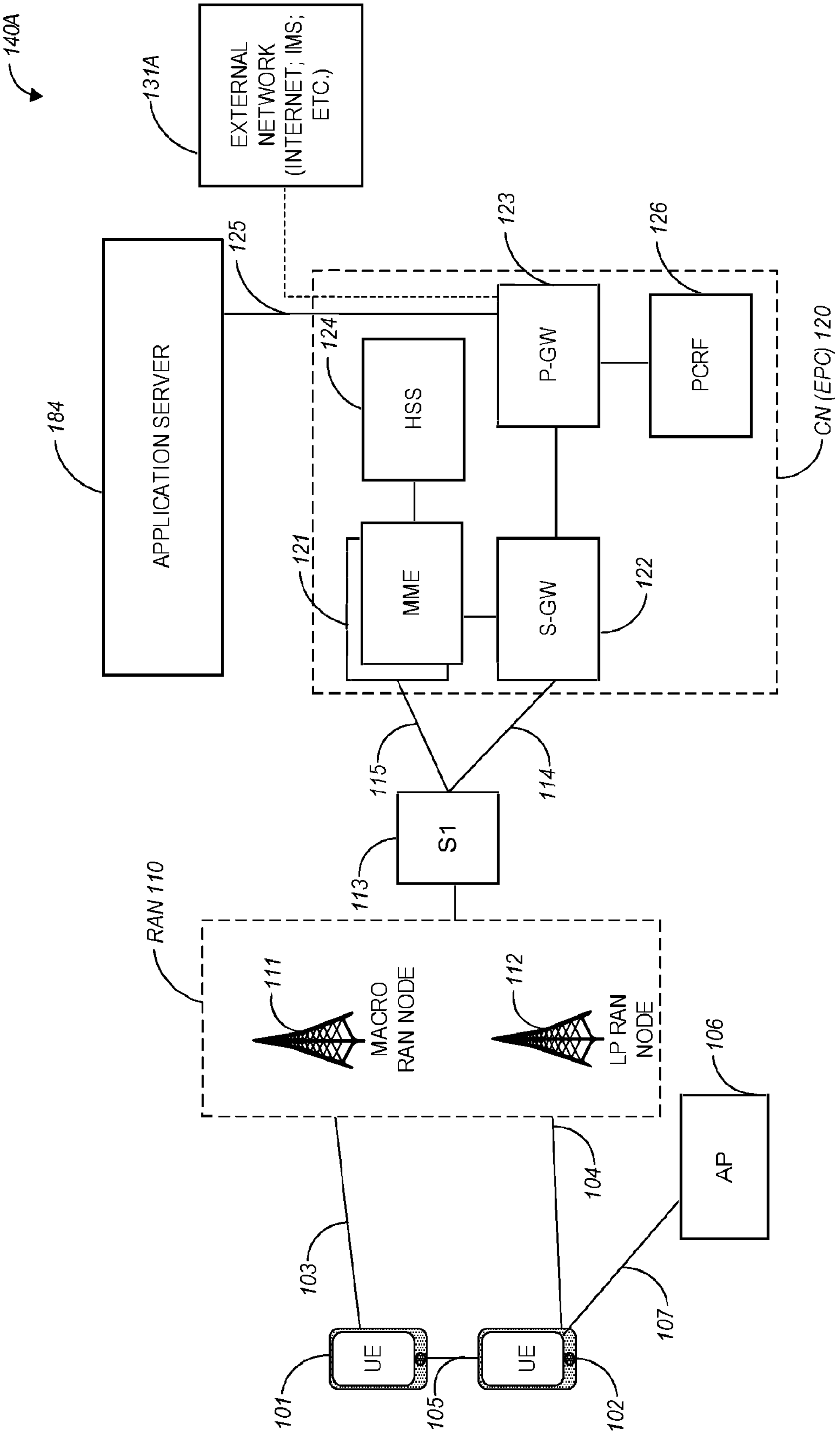
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIOT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
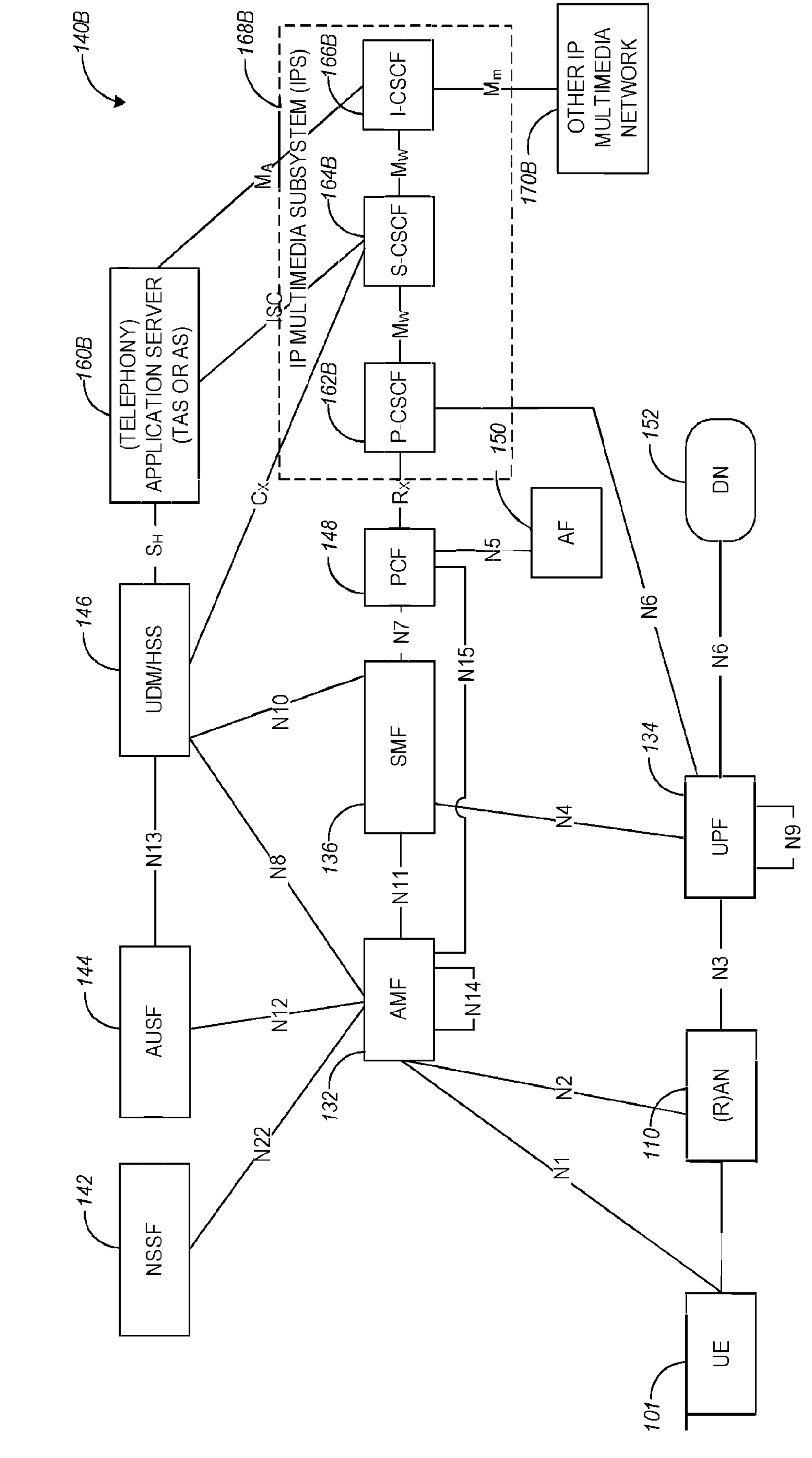
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
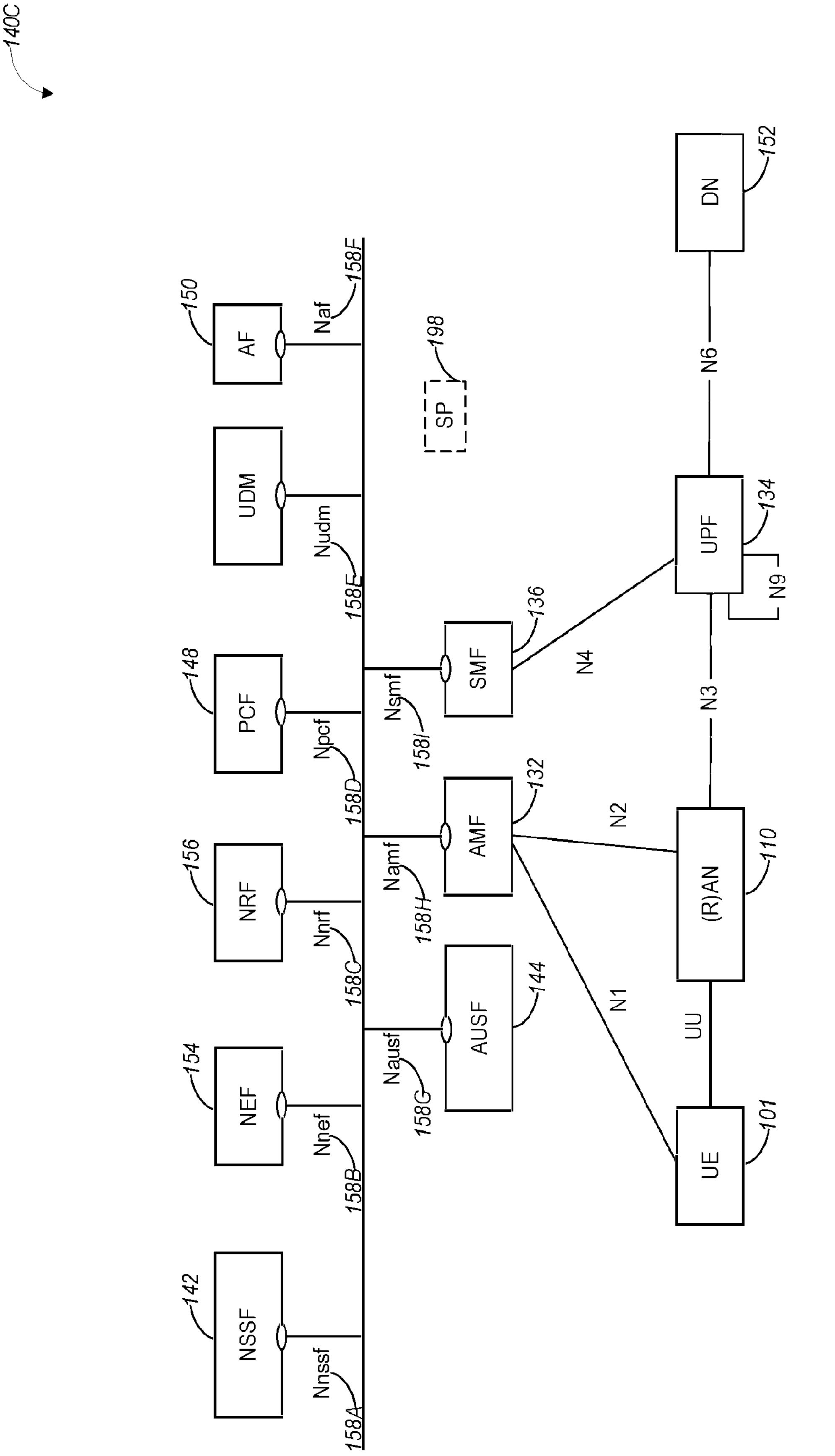

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

In NR, number of repetitions can be configured or dynamically indicated in the downlink control information (DCI) for the transmission of physical uplink shared channel (PUSCH). For PUSCH repetition type A, same time domain resource allocation (TDRA) for the transmission of PUSCH is used in each slot. Further, in Rel-17, the repetition for PUSCH repetition type A can be counted based on available slots.

In particular, a two-step approach is used for enhancement on PUSCH repetition type A, where in the first step, a UE determine available slots for K repetitions based on radio resource control (RRC) configuration(s) in addition to time domain resource allocation (TDRA) in the downlink control information (DCI) scheduling the PUSCH, configured grant (CG) configuration or activation DCI. In the second step, the UE determines whether to drop a PUSCH repetition or not according to Rel-15/16 PUSCH dropping rules, but the PUSCH repetition is still counted in the K repetitions.

Figure 2:
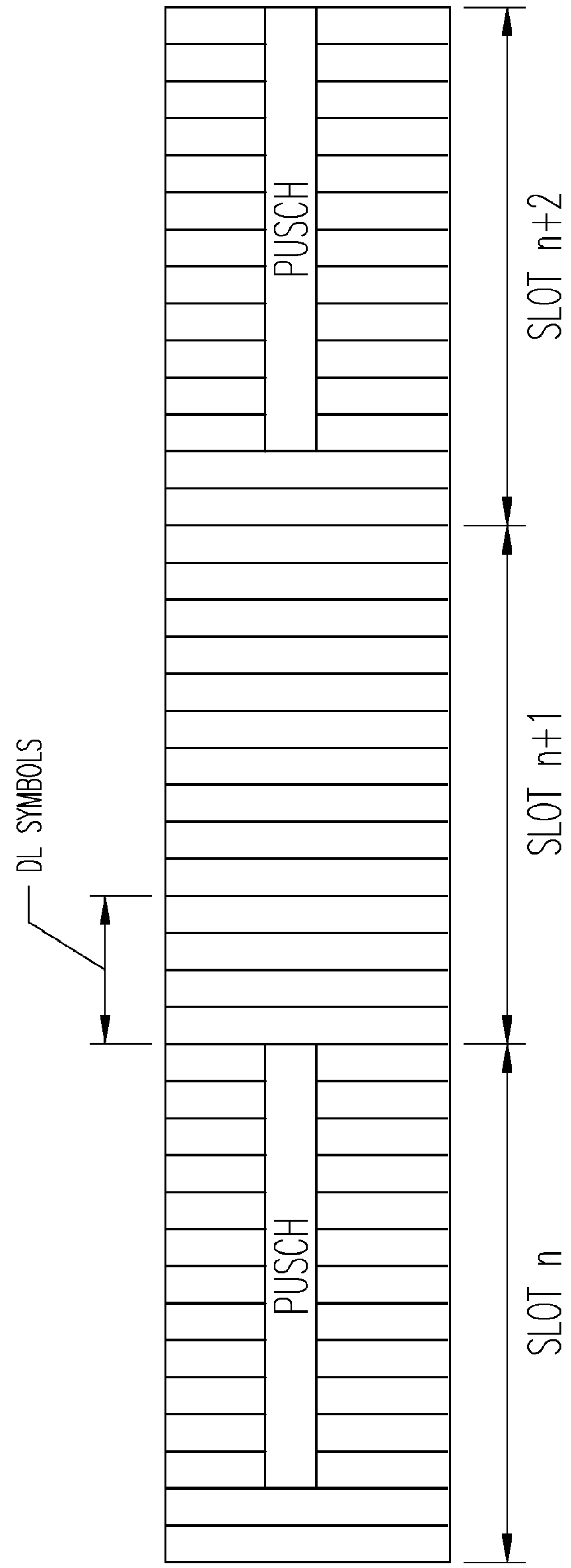
FIG. 2 PUSCH repetition type A with counting based on available slots, in accordance with some embodiments.

FIG. 2 illustrates one example of PUSCH repetition type A with counting based on available slots. In the FIG. 2, PUSCH repetitions are allocated. As the allocated symbols for PUSCH transmission overlaps with DL symbols which are configured by semi-static TDD UL/DL configuration, slot #(n+1) is not available for PUSCH repetition. In this case, slot #n and slot #(n+2) are considered as available slots for PUSCH repetitions.

For frequency range 2 (FR2), a cellular communication system is vulnerable to blockages due to higher penetration losses and reduced diffraction. In Rel-17, multiple transmit receive point (multi-TRP) operation for PUSCH repetitions was introduced, where different Tx beams can be applied for PUSCH repetitions in order to improve the reliability of uplink transmission. However, when PUSCH repetition type A with counting based on available slots is used for multi-TRP operation, certain mechanisms may need to be considered for Tx beam determination.

Embodiments disclosed herein are directed to systems and methods of enhanced PUSCH repetitions for multi-TRP operation. In particular, PUSCH repetition type A with counting based on available slots for multi-TRP operation.

Events for demodulation reference signal (DMRS) bundling for PUSCH and physical uplink control channel (PUCCH) repetitions.

PUSCH repetition type A with counting based on available slots for multi-TRP operation.

As mentioned above, in Rel-17, the repetition for PUSCH repetition type A can be counted based on available slots. In particular, a two-step approach is used for enhancement on PUSCH repetition type A, where in the first step, a UE determine available slots for K repetitions based on radio resource control (RRC) configuration(s) in addition to time domain resource allocation (TDRA) in the downlink control information (DCI) scheduling the PUSCH, configured grant (CG) configuration or activation DCI. In the second step, the UE determines whether to drop a PUSCH repetition or not according to Rel-15/16 PUSCH dropping rules, but the PUSCH repetition is still counted in the K repetitions.

Embodiments of PUSCH repetition type A with counting based on available slots for multi-TRP operation are provided as follows:

In one embodiment, when PUSCH repetition type A is counted based on available slots, or when AvailableSlot-Counting is enabled, same symbol allocation is applied across the K available slots. Further, Tx beam pattern is applied on the K available slots that are determined for PUSCH transmissions.

Note that the available slots are determined for K repetitions based on RRC configuration(s) in addition to TDRA in the DCI scheduling the PUSCH, CG configuration or activation DCI. In particular, a slot is not counted in the number of K slots for PUSCH transmission of a PUSCH repetition Type A scheduled by DCI format 0_1 or 0_2 if at least one of the symbols indicated by the indexed row of the used resource allocation table in the slot overlaps with a DL symbol indicated by tdd-UL-DLConfigurationCommon or tdd-UL-DL-ConfigurationDedicated if provided, or a symbol of an SS/PBCH block with index provided by ssb-PositionsInBurst.

Figure 3:
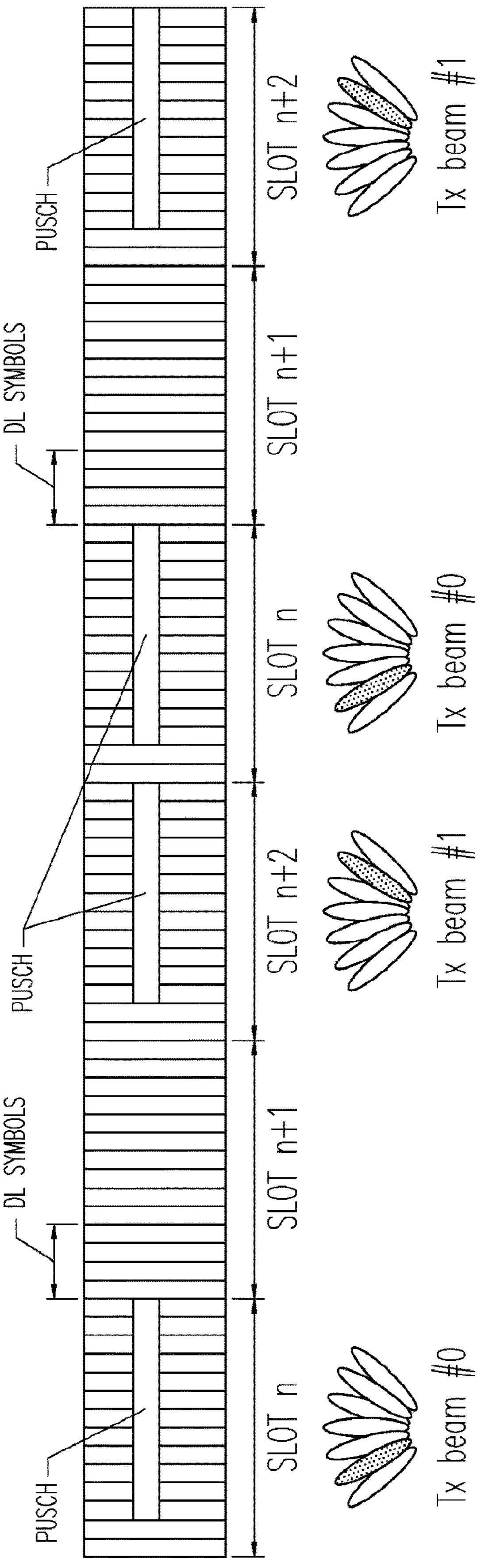
FIG. 3 illustrates cyclic beam pattern for PUSCH repetition type A with counting based on available slots, in accordance with some embodiments.

FIG. 3 illustrates one example of cyclic beam pattern for PUSCH repetition type A with counting based on available slots. In the example, cyclicMapping in PUSCH-Config is enabled. Further, 4 repetitions are used for PUSCH repetition type A. Based on the rule for determination of available slots for PUSCH repetition type A, slot #n+1 and slot #n+4 are not counted as available slots. In this case, a first Tx beam or sounding reference signal (SRS) resource set is applied for PUSCH repetition in slot #n and #n+3, while a second Tx beam or SRS resource set is applied for PUSCH repetitions in slot #n+2 and #n+5, respectively.

Figure 4:
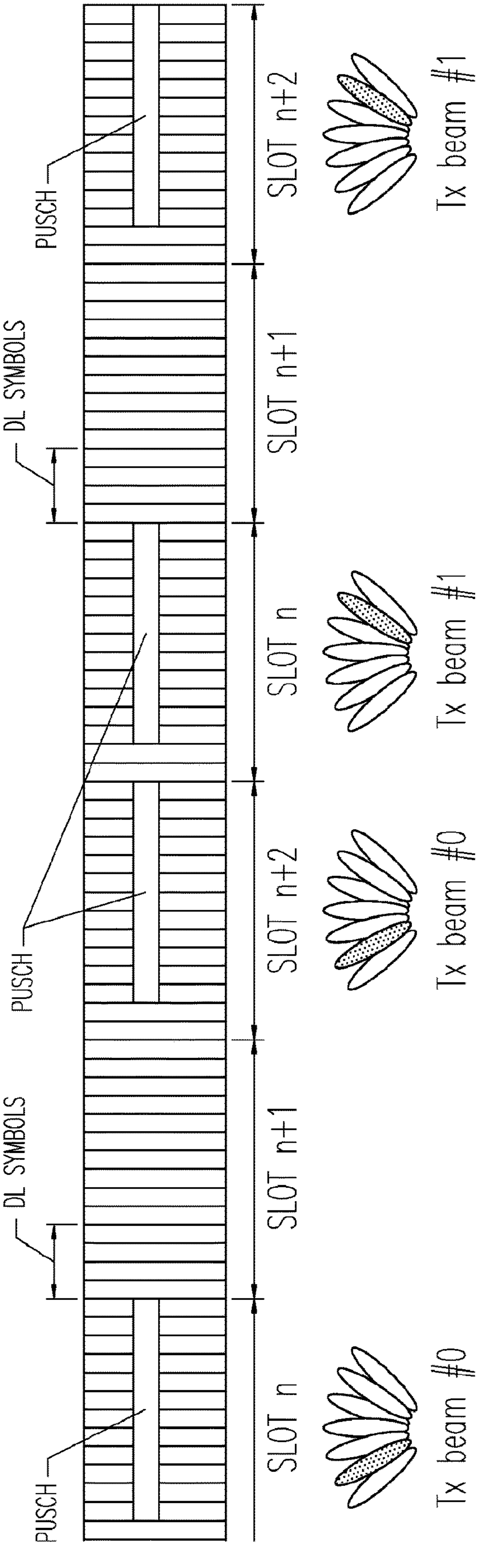
FIG. 4 illustrates sequential beam pattern for PUSCH repetition type A with counting based on available slots, in accordance with some embodiments.

FIG. 4 illustrates one example of sequential beam pattern for PUSCH repetition type A with counting based on available slots. In the example, sequentialMapping in PUSCH-Config is enabled. Further, 4 repetitions are used for PUSCH repetition type A. Based on the rule for determination of available slots for PUSCH repetition type A, slot #n+1 and slot #n+4 are not counted as available slots. In this case, a first Tx beam or SRS resource set is applied for PUSCH repetition in slot #n and #n+2, while a second Tx beam or SRS resource set is applied for PUSCH repetitions in slot #n+3 and #n+5, respectively.

The following text for the Tx beam pattern for PUSCH repetition type A with counting based on available slots can be updated in Subclause 6.1.2.1 in TS38.214.

6.1.2.1 Resource Allocation in Time Domain

When two SRS resource sets are configured in srs-ResourceSetToAddModList or srs-ResourceSetToAddModListDCI-0-2 with higher layer parameter usage in SRS-ResourceSet set to 'codebook' or 'noncodebook', for PUSCH repetition Type A, when Available SlotCounting is enabled, in case K>1, the same symbol allocation is applied across the K slots determined for the PUSCH transmission, and the PUSCH is limited to a single transmission layer. The UE shall repeat the TB across the K slots applying the same symbol allocation in each slot, and the association of the first and second SRS resource set in srs-ResourceSetToAddModList or srs-ResourceSetToAddModListDCI-0-2 to each slot is determined as follows:

- if a DCI format 0_1 or DCI format 0_2 indicates codepoint "00" for the SRS resource set indicator, the first SRS resource set is associated with all K slots determined for the PUSCH transmissions,
- if a DCI format 0_1 or DCI format 0_2 indicates codepoint "01" for the SRS resource set indicator, the second SRS resource set is associated with all K slots determined for the PUSCH transmissions,
- if a DCI format 0_1 or DCI format 0_2 indicates codepoint "10" for the SRS resource set indicator, the first and second SRS resource set association to K slots is determined as follows:
- When K=2, the first and second SRS resource sets are applied to the first and second slot of 2 slots determined for the PUSCH transmissions, respectively.
- When K>2 and cyclicMapping in PUSCH-Config is enabled, the first and second SRS resource sets are applied to the first and second slot of K slots determined for the PUSCH transmissions, respectively, and the same SRS resource set mapping pattern continues to the remaining slots of K slots determined for the PUSCH transmissions.
- When K>2 and sequentialMapping in PUSCH-Config is enabled, first SRS resource set is applied to the first and second slots of K slots determined for the PUSCH transmissions, and the second SRS resource set is applied to the third and fourth slot of K slots determined for the PUSCH transmissions, and the same SRS resource set mapping pattern continues to the remaining slots of K slots determined for the PUSCH transmissions.
- Otherwise, a DCI format 0_1 or DCI format 0_2 indicates codepoint "11" for the SRS resource set indicator, and the first and second SRS resource set association to K slots is determined as follows,
- When K=2, the second and first SRS resource set are applied to the first and second slot of 2 slots determined for the PUSCH transmissions, respectively.
- When K>2 and cyclicMapping in PUSCH-Config is enabled, the second and first SRS resource sets are applied to the first and second slot of K slots determined for the PUSCH transmissions, respectively, and the same SRS resource set mapping pattern continues to the remaining slots of the K slots determined for the PUSCH transmissions.
- When K>2 and sequentialMapping in PUSCH-Config is enabled, the second SRS resource set is applied to the first and second slot of K slots determined for the PUSCH transmissions, and the first SRS resource set is applied to the third and fourth slot of K slots determined for the PUSCH transmissions, and the same SRS resource set mapping pattern continues to the remaining slots of the K slots determined for the PUSCH transmissions.

In another embodiment, when PUSCH repetition type A is counted based on physical slot, or when AvailableSlotCounting is disabled, same symbol allocation is applied across the K consecutive slots. In addition, the Tx beam sweeping pattern is applied on the K consecutive slots.

The following text for the Tx beam pattern for PUSCH repetition type A with counting based on physical slots can be updated in Subclause 6.1.2.1 in TS38.214.

6.1.2.1 Resource Allocation in Time Domain

When two SRS resource sets are configured in srs-ResourceSetToAddModList or srs-ResourceSetToAddModListDCI-0-2 with higher layer parameter usage in SRS-ResourceSet set to 'codebook' or 'noncodebook', for PUSCH repetition Type A, when AvailableSlotCounting is disabled, in case K>1, the same symbol allocation is applied across the K consecutive slots and the PUSCH is limited to a single transmission layer. The UE shall repeat the TB across the K consecutive slots applying the same symbol allocation in each slot, and the association of the first and second SRS resource set in srs-ResourceSetToAddModList or srs-ResourceSetToAddModListDCI-0-2 to each slot is determined as follows:

In another embodiment, the above embodiments can be applied for the transmission of transport block (TB) processing over multiple slots. Note that PUSCH transmissions of TB processing over multiple slots are counted based on available slots, the Tx beam pattern can be determined in accordance with the available slot index. Note that this can apply for the TB processing over multiple slots with and/or without repetition.

The following text for the Tx beam pattern for TB processing over multiple slots can be updated in Subclause 6.1.2.1 in TS38.214.

6.1.2.1 Resource Allocation in Time Domain

When two SRS resource sets are configured in srs-ResourceSetToAddModList or srs-ResourceSetToAddModListDCI-0-2 with higher layer parameter usage in SRS-ResourceSet set to 'codebook' or 'noncodebook', for TB processing over multiple slots, the same symbol allocation is applied across the N. K slots determined for the PUSCH transmission, and the PUSCH is limited to a single transmission layer. The UE shall transmit the TB applying the same symbol allocation in each slot, and the association of the first and second SRS resource set in srs-ResourceSetToAddModList or srs-ResourceSetToAddModListDCI-0-2 to each slot is determined as follows:

Events for DMRS bundling for PUSCH and PUCCH repetitions

Embodiments of the events for DMRS bundling for PUSCH and PUCCH repetitions are provided as follows:

In another embodiment, PUSCH repetitions with different sets of power control parameters in multi-TRP operation can be considered as an event that causes power consistency and phase continuity not to be maintained across PUSCH repetitions. Further, the event may be considered as semi-static event, so that UE would restart the DMRS bundling after the event during a nominal time domain window without UE capability.

The following text for the definition of events can be updated in Subclause 6.1.7 in TS38.214.

6.1.7 UE Procedure for Determining Time Domain Windows for Bundling DM-RS

Events which cause power consistency and phase continuity not to be maintained across PUSCH transmissions of PUSCH repetition type A scheduled by DCI format 0_1 or 0_2, or PUSCH repetition Type A with a configured grant, or PUSCH repetition type B or TB processing over multiple slots, or PUCCH transmissions of PUCCH repetition, within the nominal TDW, are:

- A downlink slot or downlink reception or downlink monitoring based on tdd-UL-DL-ConfigurationCommon and tdd-UL-DL-ConfigurationDedicated for unpaired spectrum.
- The gap between any two consecutive PUSCH transmissions, or the gap between any two consecutive PUCCH transmissions, exceeds 13 symbols.
- The gap between any two consecutive PUSCH transmissions, or the gap between any two consecutive PUCCH transmissions, does not exceed 13 symbols but other uplink transmissions are scheduled between the two consecutive PUSCH transmissions or the two consecutive PUCCH transmissions.
- For PUSCH transmissions of PUSCH repetition type A, or PUSCH repetition type B or TB processing over multiple slots, a dropping or cancellation of a PUSCH transmission according to clause 9, clause 11.1 and clause 11.2A of TS 38.213.
- For PUCCH transmissions of PUCCH repetition, a dropping or cancellation of a PUCCH transmission according to clause 9, clause 9.2.6 and clause 11.1 of TS 38.213.
- For any two consecutive PUSCH transmissions of PUSCH repetition type A, or PUSCH repetition type B, and when two SRS resource sets are configured in srs-Resource SetToAddModList or srs-ResourceSetToAddModListDCI-0-2 with higher layer parameter usage in SRS-ResourceSet set to 'codebook' or 'noncodebook' or first and second sets of power control parameters are configured as described in TS 38.321 and in clause 7.1.1 of TS 38.213, a different SRS resource set association is or different power control parameters are used for the two PUSCH transmissions of PUSCH repetition type A, or PUSCH repetition type B, according to Clause 6.1.2.1.
- For any two consecutive PUCCH transmissions of PUCCH repetition, and when a PUCCH resource used for repetitions of a PUCCH transmission by a UE includes first and second spatial relations or first and second sets of power control parameters, as described in TS 38.321 and in clause 7.2.1 of TS 38.213, different spatial relations or different power control parameters are used for the two PUCCH transmissions of PUCCH repetition, according to Clause 9.2.6 of TS 38.213.
- Uplink timing adjustment in response to a timing advance command according to clause 4.2 of TS 38.213.
- Frequency hopping.

The UE shall maintain power consistency and phase continuity within an actual TDW, across PUSCH transmissions of PUSCH repetition Type A scheduled by DCI format 0_1 or 0_2, or PUSCH repetition Type A with a configured grant, or PUSCH repetition type B or TB processing over multiple slots, or across PUCCH transmissions of PUCCH repetition, in case the actual TDW is created in response to frequency hopping, or in response to the use of a different SRS resource set association or different power control parameters for the two PUSCH transmissions of PUSCH repetition type A, or PUSCH repetition type B, or in response to the use of different spatial relations or different power control parameters for the two PUCCH transmissions of PUCCH repetition, or in response to any event not triggered by DCI or MAC-CE. The UE maintains power consistency and phase continuity within an actual TDW, across PUSCH transmissions of PUSCH repetition Type A scheduled by DCI format 0_1 or 0_2, or PUSCH repetition Type A with a configured grant, or PUSCH repetition type B or TB processing over multiple slots, or across PUCCH transmissions of PUCCH repetition, in case the actual TDW is created in response to an event triggered by DCI other than frequency hopping or by MAC-CE, subject to UE capability.

In NR Rel-15, a number of repetitions can be configured for the transmission of physical uplink shared channel (PUSCH) to help improve the coverage performance. When repetition is employed for the transmission of physical uplink control channel (PUSCH) and PUSCH, same time domain resource allocation (TDRA) is used in each slot. In addition, inter-slot frequency hopping can be configured to improve the performance by exploiting frequency diversity. In Rel-16, the number of repetitions for PUSCH can be dynamically indicated in the DCI.

To further improve the coverage performance, advanced receiver including joint channel estimation algorithm or demodulation reference signal (DMRS) bundling can be employed, which can help in improving the channel estimation performance, and hence overall link budget of uplink transmission. This is of primary importance as coverage enhancement solutions are mainly targeted for low SNR regime where channel estimation is typically a performance bottleneck.

For joint channel estimation, a time domain window can be defined during which a UE is expected to maintain power consistency and phase continuity among PUSCH or PUCCH transmissions subject to power consistency and phase continuity requirements. Further, when UE is configured to accumulate TPC commands, it is reasonable to consider that group common transmit power control (TPC) command is not part of events that violate the power consistency and phase continuity as UE may accumulate the TPC commands and adjust the transmit power accordingly in the next available time domain window.

Embodiments disclosed herein provide systems and methods of transmit power control for demodulation reference signal (DMRS) bundling for coverage enhancement. In particular:

Mechanisms on transmit power control for DMRS bundling.

DMRS bundling for time domain window.

Tx beam determination for Msg3 repetition

Mechanisms on transmit power control for DMRS bundling

As mentioned above, to further improve the coverage performance, advanced receiver including joint channel estimation algorithm or demodulation reference signal (DMRS) bundling can be employed, which can help in improving the channel estimation performance, and hence overall link budget of uplink transmission. This is of primary importance as coverage enhancement solutions are mainly targeted for low SNR regime where channel estimation is typically a performance bottleneck.

For joint channel estimation, a time domain window can be defined during which a UE is expected to maintain power consistency and phase continuity among PUSCH or PUCCH transmissions subject to power consistency and phase continuity requirements. Further, when UE is configured to accumulate TPC commands, it is reasonable to consider that group common transmit power control (TPC) command is not part of events that violate the power consistency and phase continuity as UE may accumulate the TPC commands and adjust the transmit power accordingly in the next available time domain window.

Embodiments of mechanisms on transmit power control for DMRS bundling for PUSCH and PUCCH repetitions are provided as follows:

In one embodiment, if UE is configured to accumulate transmit power control (TPC) commands, and if UE receives TPC commands that would take into effect during a nominal time domain window (TDW), UE accumulates TPC commands without taking effect during the current configured TDW. TPC commands take effect after the current nominal TDW. Further, if UE is not configured to accumulate TPC commands, the last TPC command that would take effect within a nominal TDW supersedes all previous TPC commands that take effect within that configured TDW and only the last TPC command is applied by the UE after the current nominal TDW. Note that this is applied for both PUSCH and PUCCH repetitions.

As mentioned above, some embodiments are directed to a user equipment (UE) configured for operation in a fifth-generation (5G) new radio (NR) network. In these embodiments, the UE may determine one or more nominal time-domain windows (TDWs) for demodulation reference signals (DMRS) bundling for physical uplink control channel (PUCCH) transmissions of a PUCCH repetition. The UE may also determine a start of a new actual TDW for the DMRS bunding in response to an event which causes power consistency and phase continuity not to be maintained across the PUCCH transmissions of the PUCCH repetition. The new actual TDW may start after the event. In these embodiments, the UE may be configured to maintain power consistency and phase continuity within the new actual TDW across two PUCCH transmissions of the PUCCH repetition.

In some of these embodiments, the event may comprise a use of different power control parameters for the two of the PUCCH transmissions of the PUCCH repetition within one of the nominal TDWs.

In some embodiments, for the DMRS bundling, the UE may be configured to transmit DMRS in a same slot or in multiple time slots for coverage enhancement. In these embodiments, for the PUCCH repetition, the UE may use a same time domain resource allocation (TDRA) in each slot. In these embodiments, a generation Node B (gNB) may perform a joint channel estimation on the DMRS in the same time slot or in the multiple time slots to improve the accuracy of channel estimation and enhance the coverage. The channel estimate may be used by the gNB to decode the PUCCH transmissions of the PUCCH repetition.

In some embodiments, when the UE is configured for half-duplex frequency-division duplex (HD-FDD) operation, the event may comprise an overlapping of a gap between two consecutive of the PUCCH transmissions and any symbol of a downlink reception or downlink monitoring. In some embodiments, the UE may be a reduced capacity (RedCap) UE when the UE is configured for the HD-FDD operation, although the scope of the embodiments is not limited in this respect.

In some embodiments, the UE may decode one or more downlink control information (DCI) formats to obtain the different power control parameters for the two PUCCH transmissions of the PUCCH repetition. In these embodiments, the one or more DCI formats may include two accumulated transmit power control (TPC) command values.

In some embodiments, the UE may be configured to refrain from applying the accumulated TPC command values in a current nominal TDW for DMRS bundling and may apply the accumulated TPC command values in a next nominal TDW for DMRS bundling. In these embodiments, UE accumulates TPC commands without taking effect during the current configured TDW. In some embodiments, the TPC commands may take effect after the current nominal TDW. In these embodiments, the UE applies the accumulated TPC command in a next nominal TDW for DMRS bundling.

In some embodiments, the one or more DCI formats include a DCI format 2_2 with Cyclic Redundancy Check (CRC) scrambled by a TPC-PUCCH-Radio Network Temporary Identifier (RNTI) (TPC-PUCCH-RNTI). In these embodiments, the DCI format 2_2 may indicate one of the accumulated TPC command values. In some of these embodiments, when the UE receives a first TPC command from a first DCI format, the UE applies the TPC value to determine the transmit power for the PUCCH. When the UE receives the second TPC command from a second DCI format, the UE applies the second TPC value based on the previously determined transmit power to determine the transmit power of the PUCCH. In these embodiments, the transmit power calculation is based on a previously determined transmit power.

In some embodiments, the UE may be configured for DMRS bundling for coverage enhancement when operating in FR1 at 3.5 GHz although the scope of the embodiments is not limited in this respect.

In some embodiments, the UE may also be configured to determine one or more nominal TDW for DMRS bundling for physical uplink shared channel (PUSCH) transmissions of a PUSCH repetition. In these embodiments, the UE may determine a start of a new actual TDW for the DMRS bunding, for the PUSCH transmission of the PUSCH repetition, in response to an event which causes power consistency and phase continuity not to be maintained across the PUSCH transmissions of the PUSCH repetition. In these embodiments, the UE may be configured to maintain power consistency and phase continuity within the new actual TDW across two PUSCH transmissions of the PUSCH repetition.

In some embodiments, the event that causes power consistency and phase continuity not to be maintained across the PUSCH transmissions of the PUSCH repetition may comprises use of different power control parameters for the two of the PUSCH transmissions of the PUSCH repetition within one of the nominal TDWs, although the scope of the embodiments is not limited in this respect.

In some embodiments, the UE may be configured to transmit the PUSCH transmissions of the PUSCH repetition to more than one transmission-reception point (TRP) of a gNB, although this is not a requirement.

Some embodiments are directed to non-transitory computer-readable storage medium that stores instructions for execution by processing circuitry of a user equipment (UE) configured for operation in a 5G NR network. In these embodiments, the processing circuitry is configured to determine one or more nominal time-domain windows (TDWs) for demodulation reference signals (DMRS) bundling for physical uplink control channel (PUCCH) transmissions of a PUCCH repetition. The processing circuitry may also determine a start of a new actual TDW for the DMRS bunding in response to an event which causes power consistency and phase continuity not to be maintained across the PUCCH transmissions of the PUCCH repetition. In these embodiments, the new actual TDW may start after the event. In these embodiments, the processing circuitry may also configure the UE to maintain power consistency and phase continuity within the new actual TDW across two PUCCH transmissions of the PUCCH repetition.

Some embodiments are directed to a generation node B (gNB) configured for operation in a fifth-generation (5G) new radio (NR) network. In these embodiments, for a user equipment (UE) configured for demodulation reference signals (DMRS) bundling for physical uplink control channel (PUCCH) transmissions of a PUCCH repetition, gNB may process bundled DMRS received from the UE during one or more actual time-domain windows (TDWs) and perform a joint channel estimate based on the bundled DMRS. In these embodiments, when one or more downlink control information (DCI) formats are transmitted by the gNB to the UE which cause an event which would cause power consistency and phase continuity not to be maintained by the UE across the PUCCH transmissions of the PUCCH repetition during a TDW for DMRS bundling, the gNB may decode the PUCCH transmissions of the PUCCH repetition using the channel estimate based on the bundled DMRS within the actual TDW since the UE is configured to maintain power consistency and phase continuity within the new actual TDW across two PUCCH transmissions of the PUCCH repetition.

The following text for the PUSCH transmit power control procedure can be updated in Subclause 7.1.1 in TS 38.213.

7.1.1 UE Behaviour $$f_{b,f,c}(i,l) = f_{b,f,c}(i-i_0,l) + \sum_{m=0}^{C(D_i)-1} \delta_{PUSCH,b,f,c}(m,l)$$

is the PUSCH power control adjustment state l for active UL BWP b of carrier f of serving cell c and PUSCH transmission occasion i if the UE is not provided tpc-Accumulation, where The $\delta_{PUSCH,b,f,c}$ values are given in Table 7.1.1-1

$$\sum_{m=0}^{C(D_i)-1} \delta_{PUSCH,b,f,c}(m,l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i If the UE is provided PUSCH-DMRS-bundling='enable', and for processing TPC command values provided by DCI format 2_2 with CRC scrambled by TPC-PUSCH-RNTI, $f_{b,f,c}(i,l)=f_{b,f,c}(i_1,l)$: where $i_1$ is the first transmission occasion within a nominal time domain window determined as described in TS 38.214 and i is a transmission occasion within the nominal time domain window after $i_1$.

If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $$N_{symb}^{slot},$$

and the minimum of the values provided by k2 in PUSCH-ConfigCommon for active UL BWP b of carrier f of serving cell c If the UE has reached maximum power for active UL BWP b of carrier f of serving cell c at PUSCH transmission occasion $i-i_0$ and $$\sum_{m=0}^{C(D_i)-1} \delta_{PUSCH,b,f,c}(m,l) \geq 0, \text{ then } f_{b,f,c}(i,l) = f_{b,f,c}(i-i_0,l)$$

If UE has reached minimum power for active UL BWP b of carrier f of serving cell c at PUSCH transmission occasion $i-i_0$ and $$\sum_{m=0}^{C(D_i)-1} \delta_{PUSCH,b,f,c}(m,l) \leq 0, \text{ then } f_{b,f,c}(i,l) = f_{b,f,c}(i-i_0,l)$$

A UE resets accumulation of a PUSCH power control adjustment state l for active UL BWP b of carrier f of serving cell c to $$f_{b,f,c}(k,l) = 0, k = 0, 1, \ldots, i$$

If a configuration for a corresponding $P_{O\ UE\ PUSCH,b,f,c}(j)$ value is provided by higher layers If a configuration for a corresponding 60 $_{b,f,c}(j)$ value is provided by higher layers where l is determined from the value of/as If j>1 and the UE is provided higher SRI-PUSCH-PowerControl, l is the sri-PUSCH-ClosedLoopIndex value(s) configured in any SRI-PUSCH-PowerControl with the sri-P0-PUSCH-AlphaSetId value corresponding to j If j>1 and the UE is not provided SRI-PUSCH-Power-Control or j=0, l=0

If j=1, l is provided by the value of powerControlLoop-ToUse $f_{b,f,c}(i,l)=\delta_{PUSCH,b,f,c}(i, l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

If the UE is provided PUSCH-DMRS-bundling='enable', and for processing TPC command values provided by DCI format 2_2 with CRC scrambled by TPC-PUSCH-RNTI, $f_{b,f,c}(i, l)=f_{b,f,c}(i_1, l)$; where $i_1$ is the first transmission occasion within a nominal time domain window determined as described in TS 38.214 and i is a transmission occasion within the nominal time domain window after $i_1$.

In another embodiment, the following text for the PUCCH transmit power control procedure can be updated in Subclause 7.2.1 in TS 38.213.

7.2.1 UE Behaviour $$g_{b,f,c}(i, l) = g_{b,f,c}(i - i_0, l) + \sum_{m=0}^{C(D_i)-1} \delta_{PUCCH,b,f,c}(m, l)$$

is the current PUCCH power control adjustment state l for active UL BWP b of carrier f of primary cell c and PUCCH transmission occasion i, where The $\delta_{PUCCH,b,f,c}$ values are given in Table 7.1.2-1

$$\sum_{m=0}^{C(D_i)-1} \delta_{PUCCH,b,f,c}(m, l)$$

is a sum of TPC command values in a set $C_i$ of TPC command values with cardinality $C(C_i)$ that the UE receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of primary cell c for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i If the UE is provided PUCCH-DMRS-bundling='enable', and for processing TPC command values provided by DCI format 2_2 with CRC scrambled by TPC-PUCCH-RNTI, $g_{b,f,c}(i, l)=g_{b,f,c}(i_1, l)$, where $i_1$ is the first transmission occasion within a nominal time domain window determined as described in TS 38.214 and i is a transmission occasion within the nominal time domain window after $i_1$.

If the PUCCH transmission is in response to a detection by the UE of a DCI format, $K_{PUCCH}(i)$ is a number of symbols for active UL BWP b of carrier f of primary cell c after a last symbol of a corresponding PDCCH reception and before a first symbol of the PUCCH transmission If the PUCCH transmission is not in response to a detection by the UE of a DCI format, $K_{PUCCH}(i)$ is a number of $K_{PUCCH,min}$ as symbols equal to the product of a number of symbols per slot, $$N_{symb}^{slot},$$

and the minimum of the values provided by k2 in PUSCH-ConfigCommon for active UL BWP b of carrier f of primary cell c If the UE has reached maximum power for active UL BWP b of carrier f of primary cell c at PUCCH transmission occasion $i-i_0$ and $$\sum_{m=0}^{C(D_i)-1} \delta_{PUCCH,b,f,c}(m, l) \geq 0, \text{ then } g_{b,f,c}(i, l) = g_{b,f,c}(i - i_0, l)$$

If UE has reached minimum power for active UL BWP b of carrier f of primary cell c at PUCCH transmission occasion $i-i_0$ and $$\sum_{m=0}^{C(D_i)-1} \delta_{PUCCH,b,f,c}(m, l) \leq 0, \text{ then } g_{b,f,c}(i, l) = g_{b,f,c}(i - i_0, l)$$

If a configuration of a $P_{O\_PUCCH,b,f,c}(q_u)$ value for a corresponding PUCCH power control adjustment state l for active UL BWP b of carrier f of primary cell c is provided by higher layers, $$g_{b,f,c}(k, l) = 0, k = 0, 1, \ldots, i$$

If the UE is provided PUCCH-SpatialRelationInfo, the UE determines the value of l from the value of $q_u$ based on a pucch-SpatialRelationInfold value associated with the p0-PUCCH-Id value corresponding to $q_u$ and with the closedLoopIndex value corresponding to l; otherwise, l=0

DMRS Bundling for Time Domain Window

Embodiments for DMRS bundling for time domain window are provided as follows:

In one embodiment, a downlink reception or downlink monitoring between two PUSCH or PUCCH repetitions is considered as an event for half-duplex frequency division duplex (HD-FDD) RedCap UEs.

The following text for the definition of events can be updated in Subclause 6.1.7 in TS 38.214.

6.1.7 UE Procedure for Determining Time Domain Windows for Bundling DM-RS

Events which cause power consistency and phase continuity not to be maintained across PUSCH transmissions of PUSCH repetition type A scheduled by DCI format 0_1 or 0_2, or PUSCH repetition Type A with a configured grant, or PUSCH repetition type B or TB processing over multiple slots, or PUCCH transmissions of PUCCH repetition, within the nominal TDW, are:

A downlink slot or downlink reception or downlink monitoring based on tdd-UL-DL-ConfigurationCommon and tdd-UL-DL-ConfigurationDedicated for unpaired spectrum.

For the case of reduced capability half-duplex UE, a downlink reception or downlink monitoring.

The gap between any two consecutive PUSCH transmissions, or the gap between any two consecutive PUCCH transmissions, exceeds 13 symbols.

In another embodiment, the following text for cancellation of PUSCH repetition type A and TBoMS in the second step of procedure for counting based on available slots can be updated in Subclause 6.1.2.1 in TS 38.214.

6.1.2.1 Resource Allocation in Time Domain

If a UE would transmit a PUSCH of a TB processing over multiple slots or PUSCH repetition Type A when AvailableSlotCounting is enabled over N·K slots, and the UE does not transmit the PUSCH of a TB processing over multiple slots or the PUSCH repetition Type A in a slot from the N·K slots, according to clause 9, clause 11.1 and clause 11.2A of TS 38.213, the UE counts the slots in the number of N·K slots.

Tx Beam Determination for Msg3 Repetition

Embodiments for Tx beam determination for Msg3 repetition are provided as follows:

In one embodiment, the following text for Tx beam determination for Msg3 repetitions can be updated in Subclause 8.3 in TS 38.213.

8.3 PUSCH Scheduled by RAR UL Grant

A UE can be provided in RACH-ConfigCommon a set of numbers of repetitions for a PUSCH transmission with PUSCH repetition Type A that is scheduled by a RAR UL grant or by a DCI format 0_0 with CRC scrambled by a TC-RNTI. The UE determines whether or not the RAR UL grant or the DCI format 0_0 indicates a number of $$N_{PUSCH}^{repeat}$$

repetitions for the PUSCH transmission based on a set of PRACH preambles that includes the PRACH preamble associated with the PUSCH transmission TS 38.321. If the RAR UL grant or the DCI format 0_0 indicates $$N_{PUSCH}^{repeat}$$

repetitions for the PUSCH transmission, the UE transmits the PUSCH over $$N_{PUSCH}^{repeat} \text{ slots,}$$

slots, where $$N_{PUSCH}^{repeat}$$

is indicated by the 2 MSBs of the MCS field in the RAR UL grant or in the DCI format 0_0. The UE determines a MCS for the PUSCH transmission by the 2 LSBs of the MCS field in the RAR UL grant or by the 3 LSBs of the MCS field in the DCI format 1_0 and determines a redundancy version and RBs for each repetition as described in TS 38.214. For unpaired spectrum operation, the UE determines the $$N_{PUSCH}^{repeat}$$

slots as the first $$N_{PUSCH}^{repeat}$$

slots starting from slot $n+k_2+\Delta$ where a repetition of the PUSCH transmission does not include a symbol indicated as downlink by tdd-UL-DL-ConfigurationCommon or indicated as a symbol of an SS/PBCH block with index provided by ssb-PositionsInBurst. If $$N_{PUSCH}^{repeat} > 1,$$

PUSCH repetitions scheduled by a RAR UL grant use a same spatial filter, and PUSCH repetitions scheduled by a DCI format 0_0 with CRC scrambled by a TC-RNTI use a same spatial filter.

Inter-Slot Frequency Hopping with DMRS Bundling for PUSCH Repetitions

Embodiments of inter-slot frequency hopping with DMRS bundling for PUSCH repetitions and TBoMS with and without repetition are provided as follows:

In one embodiment, relative system frame number is included in the determination of frequency hopping pattern for inter-slot frequency hopping with DMRS bundling. In particular, system radio frame has value 0 containing the first slot determined for the PUSCH transmission including first repetition of PUSCH repetitions and first slot of TBoMS transmission, and is increased by 1 for each subsequent system radio frame.

The following text for inter-slot frequency hopping with DMRS bundling for PUSCH repetitions can be updated in Subclause 6.3.1 in TS 38.214

6.3.1 Frequency Hopping for PUSCH Repetition Type A and for TB Processing Over Multiple Slots In case of inter-slot frequency hopping and when PUSCH-DMRS-Bundling is enabled, the starting RB during slot $$n_s^{\mu}$$

is given by:

$$RB_{start}(n_{s,f}^{\mu}) = \begin{cases} RB_{start} & \left\lfloor \frac{n_{s,f}^{\mu} + n_f \cdot N_{slot}^{frame,\mu}}{N_{FH}} \right\rfloor \bmod 2 = 0 \\ (RB_{start} + RB_{offset}) \bmod N_{BWP}^{size} & \left\lfloor \frac{n_{s,f}^{\mu} + n_f \cdot N_{slot}^{frame,\mu}}{N_{FH}} \right\rfloor \bmod 2 = 1 \end{cases}$$

where $$n_{s,f}^{\mu}$$

is the current slot number within a system radio frame, $n_f$ has value 0 for the system radio frame containing the first slot determined for the PUSCH transmission, and is increased by 1 for each subsequent system radio frame, $$n_{slot}^{frame,\mu}$$

slot is the number of slots per frame for subcarrier spacing configuration μ of the UL BWP that the PUSCH is transmitted on, $N_{FH}$ is the value of the higher layer parameter PUSCH-Frequencyhopping-Interval, if provided; otherwise, $N_{FH}$ is the value of PUSCH-TimeDomainWindowLength, $RB_{start}$ is the starting RB within the UL BWP, as calculated from the resource block assignment information of resource allocation type 1 and $RB_{offset}$ is the frequency offset in RBs between the two frequency hops.

In another option, the following text for inter-slot frequency hopping with DMRS bundling for PUSCH repetitions can be updated in Subclause 6.3.1 in TS 38.214

6.3.1 Frequency Hopping for PUSCH Repetition Type A and for TB Processing Over Multiple Slots In case of inter-slot frequency hopping and when PUSCH-DMRS-Bundling is enabled, the starting RB during slot $$n_s^{\mu}$$

is given by:

$$RB_{start}(n_{s,f}^{\mu}) = \begin{cases} RB_{start} & \left\lfloor \dfrac{n_{s,f}^{\mu} + (n_f - n_{f0}) \cdot N_{slot}^{frame,\mu}}{N_{FH}} \right\rfloor \bmod 2 = 0 \\ (RB_{start} + RB_{offset}) \bmod N_{BWP}^{size} & \left\lfloor \dfrac{n_{s,f}^{\mu} + (n_f - n_{f0}) \cdot N_{slot}^{frame,\mu}}{N_{FH}} \right\rfloor \bmod 2 = 1 \end{cases}$$

where $$n_{s,f}^{\mu}$$

is the current slot number within a system radio frame, $n_f$ is the number of the system radio frame containing the current slot, $n_{f0}$ is the number of system radio frame containing the first slot determined for the PUSCH transmission, $$n_{slot}^{frame,\mu}$$

is the number of slots per frame for subcarrier spacing configuration μ of the UL BWP that the PUSCH is transmitted on, $N_{FH}$ is the value of the higher layer parameter PUSCH-Frequencyhopping-Interval, if provided; otherwise, $N_{FH}$ is the value of PUSCH-TimeDomainWindowLength, $RB_{start}$ is the starting RB within the UL BWP, as calculated from the resource block assignment information of resource allocation type 1 and $RB_{offset}$ is the frequency offset in RBs between the two frequency hops.

In another option, the following text for inter-slot frequency hopping with DMRS bundling for PUSCH repetitions can be updated in Subclause 6.3.1 in TS 38.214

6.3.1 Frequency Hopping for PUSCH Repetition Type A and for TB Processing Over Multiple Slots In case of inter-slot frequency hopping and when PUSCH-DMRS-Bundling is enabled, the starting RB during slot $$n_s^{\mu}$$

is given by:

$$RB_{start}(n_{s,f}^{\mu}) = \begin{cases} RB_{start} & \left\lfloor \dfrac{n_{s,f}^{\mu} + |n_f - n_{f0}| \cdot N_{slot}^{frame,\mu}}{N_{FH}} \right\rfloor \bmod 2 = 0 \\ (RB_{start} + RB_{offset}) \bmod N_{BWP}^{size} & \left\lfloor \dfrac{n_{s,f}^{\mu} + |n_f - n_{f0}| \cdot N_{slot}^{frame,\mu}}{N_{FH}} \right\rfloor \bmod 2 = 1 \end{cases}$$

where $$n_{s,f}^{\mu}$$

of is the current slot number within a system radio frame, $n_f$ is the number of the system radio frame containing the current slot, $n_{f0}$ is the number of system radio frame containing the first slot determined for the PUSCH transmission, $$n_{slot}^{frame,\mu}$$

slot is the number of slots per frame for subcarrier spacing configuration μ of the UL BWP that the PUSCH is transmitted on, $N_{FH}$ is the value of the higher layer parameter PUSCH-Frequencyhopping-Interval, if provided; otherwise, $N_{FH}$ is the value of PUSCH-TimeDomainWindowLength, $RB_{start}$ is the starting RB within the UL BWP, as calculated from the resource block assignment information of resource allocation type 1 and $RB_{offset}$ is the frequency offset in RBs between the two frequency hops.

In another embodiment, for the determination of frequency hopping pattern for inter-slot frequency hopping with DMRS bundling, slot index has value of slot number within a system radio frame for the first slot determined for the PUSCH transmission and is increased by 1 for each subsequent slot, regardless of whether or not the UE transmits the PUSCH in a slot.

The following text for inter-slot frequency hopping with DMRS bundling for PUSCH repetitions can be updated in Subclause 6.3.1 in TS 38.214.

6.3.1 Frequency Hopping for PUSCH Repetition Type A and for TB Processing Over Multiple Slots In case of inter-slot frequency hopping and when PUSCH-DMRS-Bundling is enabled, the starting RB during slot $$n_s^{\mu}$$

is given by:

$$RB_{start}\left(n_{s,f}^{\mu}\right)=\begin{cases} RB_{start} & \left\lfloor \frac{n_s}{N_{FH}} \right\rfloor \text{mod}2=0 \\ (RB_{start}+RB_{offset})\text{mod}N_{BWP}^{size} & \left\lfloor \frac{n_s}{N_{FH}} \right\rfloor \text{mod}2=1 \end{cases}$$

where $n_s$ has the value of slot number within a system radio frame for the first slot determined for the PUSCH transmission and is increased by 1 for each subsequent slot, regardless of whether or not the UE transmits the PUSCH in a slot, $N_{FH}$ is the value of the higher layer parameter PUSCH-Frequencyhopping-Interval, if provided; otherwise, $N_{FH}$ is the value of PUSCH-TimeDomainWindowLength, $RB_{start}$ is the starting RB within the UL BWP, as calculated from the resource block assignment information of resource allocation type 1 and $RB_{offset}$ is the frequency offset in RBs between the two frequency hops.

Figure 5:
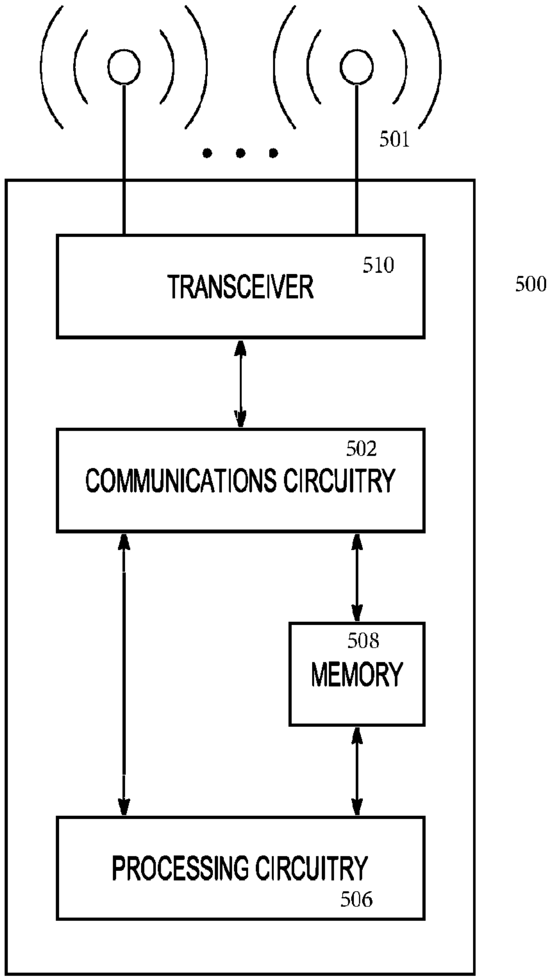
FIG. 5 illustrates a wireless communication device, in accordance with some embodiments.

FIG. 5 illustrates a functional block diagram of a wireless communication device, in accordance with some embodiments. Wireless communication device 500 may be suitable for use as a UE or gNB configured for operation in a 5G NR network. The communication device 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 500 may include communications circuitry 502 and a transceiver 510 for transmitting and receiving signals to and from other communication devices using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication device 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication device 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 500 may include one or more of a keyboard, a display, a non-volatile memory port, multiple antennas, a graphics processor, an application processor, speakers, and other mobile device elements. The display may be an LCD screen including a touch screen.

Although the communication device 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 500 may refer to one or more processes operating on one or more processing elements.

EXAMPLES

Example 1: A system and method of wireless communication for a fifth generation (5G) or new radio (NR) system:

Determined, by UE, available slots for transmission of physical uplink shared channel (PUSCH) repetition type A with counting based on available slots;

Determined, by UE, a transmit beam pattern in accordance with the determined available slot index;

Transmitted, by UE, the PUSCH repetitions in accordance with the determined transmit beam pattern.

The method of example 1, wherein available slots are determined for K repetitions based on radio resource control (RRC) configuration(s) in addition to time domain resource allocation (TDRA) in the downlink control information (DCI) scheduling the PUSCH, configured grant (CG) configuration or activation DCI, where K is the number of repetitions for PUSCH transmission.

The method of example 1, wherein a slot is not counted in the number of K slots for PUSCH transmission of a PUSCH repetition Type A scheduled by DCI format 0_1 or 0_2 if at least one of the symbols indicated by the indexed row of the used resource allocation table in the slot overlaps with a DL symbol indicated by tdd-UL-DLConfiguration-Common or tdd-UL-DL-ConfigurationDedicated if provided, or a symbol of an SS/PBCH block with index provided by ssb-PositionsInBurst.

The method of example 1, wherein Tx beam pattern is applied on the K available slots that are determined for PUSCH transmissions.

The method of example 1, wherein when PUSCH repetition type A is counted based on physical slot, or when AvailableSlotCounting is disabled, Tx beam sweeping pattern is applied on the K consecutive slots.

The method of example 1, wherein Tx beam pattern for transport block (TB) processing over multiple slots is applied on the N·K available slots that are determined for PUSCH transmissions, where N is the number of slots used for TBS determination and K is the number of repetitions.

The method of example 1, wherein PUSCH repetitions with different sets of power control parameters in multi-TRP operation can be considered as a semi-static event that causes power consistency and phase continuity not to be maintained across PUSCH repetitions.

Example 2: A system and method of wireless communication for a fifth generation (5G) or new radio (NR) system:

- Decoded, by a UE, a transmit power control command (TPC) in a downlink control information DCI format 2_2 with Cyclic Redundancy Check (CRC) scrambled by TPC-PUSCH-RNTI or TPC-PUCCH-RNTI;
- Applied, by a UE, an accumulated TPC command in a next nominal time domain window for demodulation reference signal (DMRS) bundling.

The method of example 2, wherein same transmit power control command is applied for the transmission occasion in a nominal time domain window for physical uplink shared channel (PUSCH) repetitions;

The method of example 2, wherein same transmit power control command is applied for the transmission occasion in a nominal time domain window for physical uplink control channel (PUCCH) repetitions;

The method of example 2, wherein PUSCH repetitions with different sets of power control parameters in multi-TRP operation can be considered as a semi-static event that causes power consistency and phase continuity not to be maintained across PUSCH repetitions The method of example 2, wherein a downlink reception or downlink monitoring between two PUSCH or PUCCH repetitions is considered as an event for half-duplex frequency division duplex (HD-FDD) RedCap UEs.

The method of example 2, wherein relative system frame number is included in the determination of frequency hopping pattern for inter-slot frequency hopping with DMRS bundling.

The method of example 2, wherein for the determination of frequency hopping pattern for inter-slot frequency hopping with DMRS bundling, slot index has value of slot number within a system radio frame for the first slot determined for the PUSCH transmission and is increased by 1 for each subsequent slot, regardless of whether or not the UE transmits the PUSCH in a slot.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operation in a fifth-generation new radio (5G N R) network, the apparatus comprising: processing circuitry; and memory, wherein the processing circuitry is configured to:

- decode one or more DCI formats, the one or more DCI formats including two transmit power control (TPC) commands, each TPC command associated with different power control parameters;
- determine one or more nominal time-domain windows (TDWs) for demodulation reference signals (DMRS) bundling for physical uplink control channel (PUCCH) transmissions of a PUCCH repetition;
- determine a start of a new actual TDW for DMRS bunding in response to an event which causes power consistency and phase continuity not to be maintained across the PUCCH transmissions of the PUCCH repetition, the new actual TDW to start after the event; and
- configure the UE to maintain power consistency and phase continuity within the new actual TDW across PUCCH transmissions of the PUCCH repetition,
- wherein the event comprises a use of the different power control parameters for two of the PUCCH transmissions of the PUCCH repetition within one of the nominal TDWs, and
- wherein when the UE is configured for TPC accumulation, the processing circuitry is to configure the UE to accumulate TPC commands during the PUCCH transmissions of the PUCCH repetition, and
- wherein when the UE is a reduced capability UE configured for half-duplex frequency-division duplex (HD-FDD) operation, the event further comprises an overlapping of a gap between two consecutive of the PUCCH transmissions and any symbol of a downlink reception.

2. The apparatus of claim 1, wherein when the UE is not configured for TPC accumulation, the processing circuitry is to configure the UE to apply the TPC commands as absolute values.

3. The apparatus of claim 2, wherein when the UE is configured for TPC accumulation and receives a command to activate more than one of the TPC commands during a nominal TDW, the processing circuitry configures the UE to accumulate the TPC commands and refrain from applying more than one of the TPC command within the nominal TDWs.

4. The apparatus of claim 3, wherein when the UE is configured for TPC accumulation, the processing circuitry is to configure the UE to accumulate the TPC commands during a current nominal TDW without applying the TPC commands and apply the accumulated TPC commands in a next nominal TDW.

5. The apparatus of claim 1, wherein the one or more DCI formats include a DCI format 2_2 with Cyclic Redundancy Check (CRC) scrambled by TPC-PUCCH-RNTI, the DCI format 2_2 indicating one of the TPC commands.

6. The apparatus of claim 4, wherein for physical uplink shared channel (PUSCH) transmissions of a PUSCH repetition when DMRS bundling is enabled, the processing circuitry is further configured to:

- determine one or more nominal TDWs for DMRS bundling for a PUSCH transmission of a PUSCH repetition;

determine a start of a new actual TDW for DMRS bunding, for the PUSCH transmission of the PUSCH repetition in response to an event which causes power consistency and phase continuity not to be maintained across the PUSCH transmissions of the PUSCH repetition.

7. The apparatus of claim 6, wherein the processing circuitry is further configured to configure the UE to maintain power consistency and phase continuity within the new actual TDW across two of the PUSCH transmissions of the PUSCH repetition.

8. The apparatus of claim 7, wherein when the UE is configured for TPC accumulation for the PUSCH transmissions, the processing circuitry is to configure the UE to accumulate the TPC commands and refrain from applying more than one of the TPC command within the nominal TDW for the PUSCH transmissions of the PUSCH repetition.

9. The apparatus of claim 8, wherein when the UE is configured for TPC accumulation for the PUSCH transmissions and receives a command to activate more than one of the TPC commands during a nominal TDW, the processing circuitry configures the UE to accumulate the TPC commands and refrain from applying more than one of the TPC command within the nominal TDWs across the two PUSCH transmissions of the PUSCH repetition.

10. A non-transitory computer-readable storage medium that stores instructions for execution by processing circuitry of a user equipment (UE) configured for operation in a fifth-generation new radio (5G N R) network, wherein the processing circuitry is configured to:

decode one or more DCI formats, the one or more DCI formats including two transmit power control (TPC) commands, each TPC command associated with different power control parameters;

determine one or more nominal time-domain windows (TDWs) for demodulation reference signals (DMRS) bundling for physical uplink control channel (PUCCH) transmissions of a PUCCH repetition;

determine a start of a new actual TDW for DMRS bunding in response to an event which causes power consistency and phase continuity not to be maintained across the PUCCH transmissions of the PUCCH repetition, the new actual TDW to start after the event; and configure the UE to maintain power consistency and phase continuity within the new actual TDW across PUCCH transmissions of the PUCCH repetition, wherein the event comprises a use of the different power control parameters for two of the PUCCH transmissions of the PUCCH repetition within one of the nominal TDWs, and wherein when the UE is configured for TPC accumulation, the processing circuitry is to configure the UE to accumulate TPC commands during the PUCCH transmissions of the PUCCH repetition, wherein when the UE is a reduced capability UE configured for half-duplex frequency-division duplex (HD-FDD) operation, the event further comprises an overlapping of a gap between two consecutive of the PUCCH transmissions and any symbol of a downlink reception.

11. The non-transitory computer-readable storage medium of claim 10, wherein when the UE is not configured for TPC accumulation, the processing circuitry is to configure the UE to apply the TPC commands as absolute values.

12. The non-transitory computer-readable storage medium of claim 11, wherein when the UE is configured for TPC accumulation and receives a command to activate more than one of the TPC commands during a nominal TDW, the processing circuitry configures the UE to accumulate the TPC commands and refrain from applying more than one of the TPC command within the nominal TDWs.

13. The non-transitory computer-readable storage medium of claim 12, wherein when the UE is configured for TPC accumulation, the processing circuitry is to configure the UE to accumulate the TPC commands during a current nominal TDW without applying the TPC commands and apply the accumulated TPC commands in a next nominal TDW.

14. The non-transitory computer-readable storage medium of claim 10, wherein the one or more DCI formats include a DCI format 2_2 with Cyclic Redundancy Check (CRC) scrambled by TPC-PUCCH-RNTI, the DCI format 2_2 indicating one of the TPC commands.

15. The non-transitory computer-readable storage medium of claim 13, wherein for physical uplink shared channel (PUSCH) transmissions of a PUSCH repetition when DMRS bundling is enabled, the processing circuitry is further configured to:

determine one or more nominal TDWs for DMRS bundling for a PUSCH transmission of a PUSCH repetition;

determine a start of a new actual TDW for DMRS bunding, for the PUSCH transmission of the PUSCH repetition in response to an event which causes power consistency and phase continuity not to be maintained across the PUSCH transmissions of the PUSCH repetition.

* * * * *